F. HOUSHOLDER.
VEHICLE WHEEL.
APPLICATION FILED JUNE 8, 1911.
1,028,727.
Patented June 4, 1912.
2 SHEETS—SHEET 1.
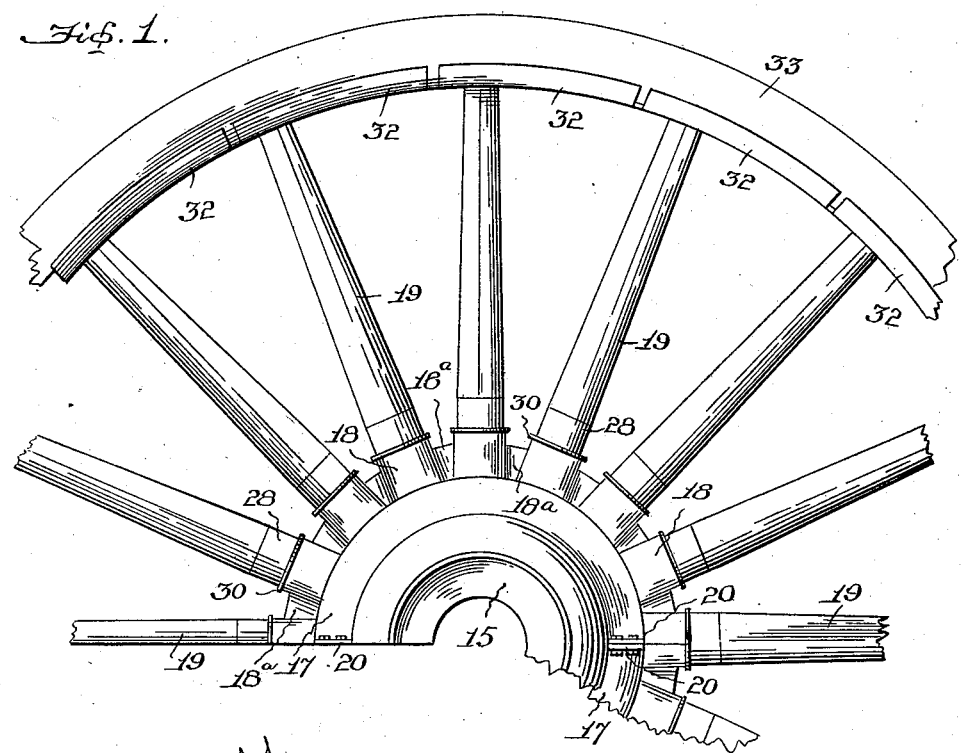
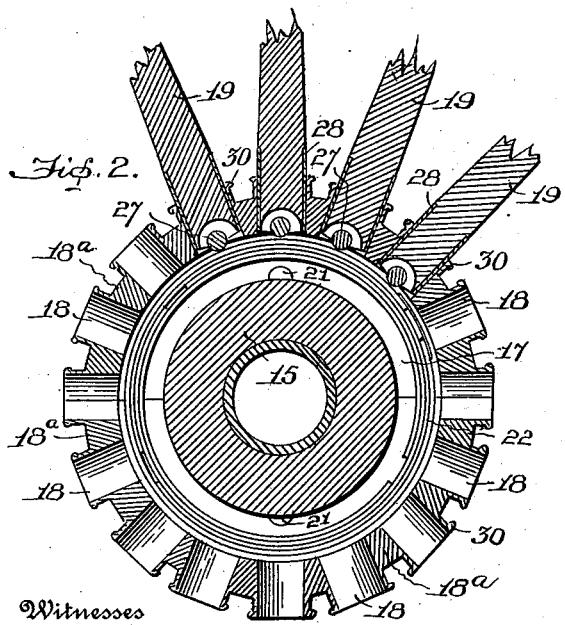
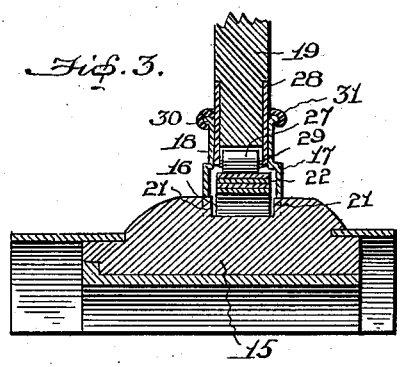
Inventor:
Frank Housholder,
By
Attorney F. HOUSHOLDER.
VEHICLE WHEEL.
APPLICATION FILED JUNE 8, 1911.
1,028,727.
Patented June 4, 1912.
2 SHEETS—SHEET 2.
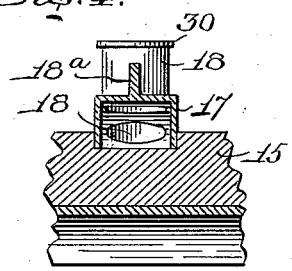
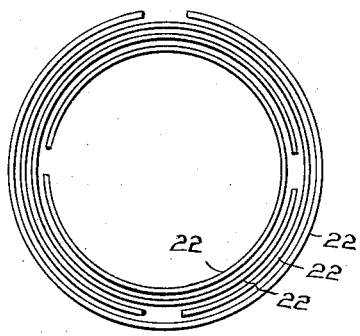
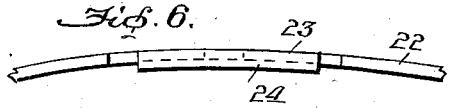
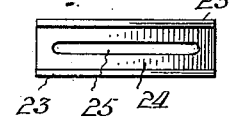
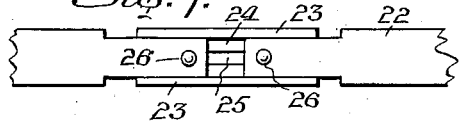
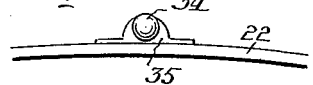
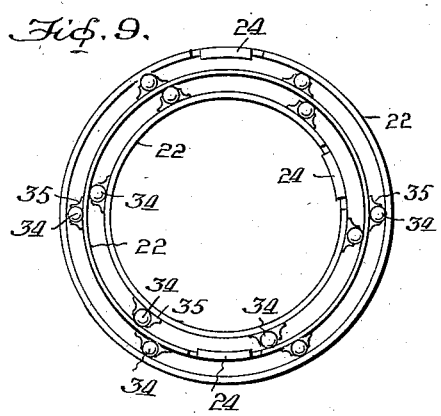
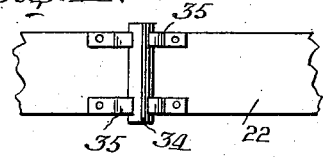
Witnesses:
Inventor:
Frank Housholder,
By
Attorney.

UNITED STATES PATENT OFFICE.

FRANK HOUSHOLDER, OF GUTHRIE, OKLAHOMA.

VEHICLE-WHEEL.

1,028,727.

Specification of Letters Patent.

Patented June 4, 1912.

Application filed June 8, 1911. Serial No. 631,972.

*To all whom it may concern:*

Be it known that I, FRANK HOUSHOLDER, a citizen of the United States, residing at Guthrie, in the county of Logan and State of Oklahoma, have invented a Vehicle-Wheel, of which the following is a specification.

My invention is an improvement in vehicle-wheels, and relates more especially to that particular class adapted for use in connection with automobiles and other motor vehicles. It is an important desideratum in this class of vehicle-wheels that the tread portion or tire afford an effective traction and also an amount of resiliency which will relieve or absorb to a great extent any jolts or jars incident to the vehicle passing over a rough road. These functions are commonly accomplished by providing the wheel with an inflated tire, but tires of this type though meeting the requirements satisfactorily to provide an easy running vehicle are however subject to puncture which causes the deflation of the tire and destroys its resiliency, oftentimes with such suddenness as to result in accident to other parts of the vehicle.

The primary object of my present invention is to provide a vehicle-wheel in which the required resiliency is secured by a construction and arrangement of parts which provide strength and durability so as to insure safety and reliability.

Other objects and advantages of the invention will hereinafter appear, and what I claim as new and desire to secure by Letters-Patent is more specifically set forth in the appended claims.

In the accompanying drawings: Figure 1 is a side view of a part of a vehicle-wheel, constructed in accordance with my invention. Fig. 2 is a sectional view through the hub of the wheel. Fig. 3 is a transverse sectional view through the hub, on a line with one of the spokes. Fig. 4 is a similar sectional view, on a line between the spokes. Fig. 5 is a detail view of the hoop-springs employed for imparting resiliency to the tread or tire of the wheel. Figs. 6, 7 and 8 are detail views showing the means employed for connecting the ends of the split-rings which form the hoop-springs. Fig. 9 is a view showing the application of anti-friction rollers between the hoop-springs. Figs. 10 and 11 are detail views, enlarged, showing the manner of supporting the rollers.

Like numerals of reference indicate like parts in all the figures of the drawings.

In carrying out my invention I provide the hub 15 of the wheel with a peripheral groove 16, in which is seated a flanged ring or annular casing 17, U-shape in cross-section, and having around its circumference a series of sockets 18, in which the inner ends of the spokes 19 of the wheel are adapted to play, for the purpose hereinafter explained. This flanged ring or annular casing is preferably formed in two parts or semi-circular sections, for convenience of attachment to the hub, both parts or sections being provided at their ends with outwardly-projecting flanges or ears 20, by which they are bolted together; and in order to prevent any movement of the casing upon the hub the latter is provided with lugs 21 at the sides of the groove 16, which fit corresponding recesses at the inner edges of the U-shape casing, as illustrated in Figs. 2 and 3 of the drawings. The series of spoke-sockets 18 are preferably formed integrally with the flanged ring, as indicated in the drawings, and are braced by connecting webs $18^a$.

The U-shape casing is for the purpose of providing a cavity around the hub at the inner ends of the spoke-sockets, and as the spokes have a longitudinal movement in said sockets they are supported at their inner ends, or within the casing, by means of hoop-springs 22, loosely mounted in said casing. As shown in Figs. 2 and 5 the hoop-springs are in the form of split-rings, of spring steel, and though in the present instance I use four, it will be understood, of course that either a less or a greater number may be used, according to the strength of the springs or amount of load the vehicle-wheel is to support. The hoop-springs or split-rings may bear directly upon each other, as illustrated in Figs. 2 and 3, or may be provided with anti-friction rollers, as shown in the modification, Fig. 9, hereinafter particularly described. Furthermore, the ends of the split-rings may be simply spaced apart, as shown in Fig. 5, but I prefer that the ends be connected in some manner, for instance as shown in Figs. 6 and 7. In this instance each end of the hoop-spring or split-ring is cut away at its sides to receive the flanged edges 23 of a connecting-plate 24, the latter having a slot 25 through which rivets 26 in the ends of the spring or split-ring pass to permit free movement of the ends to and from each other. The ends of the spokes 19 bear against the outer hoop-spring or split-ring, and in order to reduce friction the inner end of each spoke is provided with a roller 27, and to prevent wear on the inner end portion of the spoke where it plays in the socket each spoke is provided with a metal sleeve 28, the inner end of the sleeve forming the bearings for gudgeons, as 29, at the ends of the roller, as shown in Fig. 3. In order to prevent dust and dirt from entering the spoke sockets and casing for the hoop-springs the outer end of each spoke socket is provided with a bead 30, over which a rubber ring or washer 31 is sprung to embrace the spoke, as shown in Fig. 3.

In the present instance the felly of the wheel comprises a number of short sections 32, one for each spoke 19, said sections being suitably secured to the outer ends of the spokes and have upturned flanges at their edges to embrace the tire 33.

The tire may be, and preferably is, made of solid rubber, although any other form of resilient tire may be used, the principal resiliency in the present instance being imparted by the movable spokes in connection with the springs in the hub upon which said spokes bear, as will be obvious.

In order that the hoop-springs 22 may move freely upon each other during expansion and contraction of the same when the wheel is in use, I provide anti-friction rollers 34 between the springs, and support said rollers in place by means of small bearing brackets 35, which are riveted to the springs at the outer edges thereof, as shown in Fig. 11 of the drawings. Any suitable number of anti-friction rollers may be employed.

Having thus described my invention, I claim:—

1. In a vehicle-wheel, the combination with the hub and casing surrounding the same, of spoke-sockets around the casing, spokes playing in said sockets, split-rings disposed one within another and against which the inner ends of the spokes bear, and anti-friction rollers between the split-rings, substantially as shown and for the purpose set forth.

2. In a vehicle-wheel, the combination with the hub and casing surrounding the same, of spoke-sockets around the casing, split-rings located within the casing and disposed one within another, anti-friction-rollers between the split-rings, spokes movable in the sockets, and rollers journaled on the inner ends of the spokes to bear upon the outer split-ring, substantially as shown and for the purpose set forth.

3. In a vehicle-wheel, the combination with the hub and casing surrounding the same, of spoke-sockets around the casing, split-rings located within the casing and disposed one within another, anti-friction rollers between the split-rings, spokes movable in the sockets to bear against the outer split-ring, short felly-sections attached to the outer ends of the spokes, and a flexible tire around the felly, substantially as shown and described.

In testimony whereof I have signed my name to this specification in the presence of two subscribing witnesses.

FRANK HOUSHOLDER.

Witnesses:
LUDWIG HEYMANN,
ANDREW A. HARRIS.

---

Copies of this patent may be obtained for five cents each, by addressing the "Commissioner of Patents, Washington, D. C."